United States Patent [19]

Maaghul

[11] Patent Number: 4,738,701
[45] Date of Patent: Apr. 19, 1988

[54] METHOD AND APPARATUS FOR FORMING GLASS FIBERS

[75] Inventor: John Maaghul, Monroeville, Pa.

[73] Assignee: PPG Industries, Inc., Pittsburgh, Pa.

[21] Appl. No.: 3,171

[22] Filed: Jan. 14, 1987

[51] Int. Cl.⁴ .......................................... C03B 37/085
[52] U.S. Cl. ................................................ 65/1; 65/2; 65/172; 65/173
[58] Field of Search ................. 65/1, 2, 171, 172, 173

[56] References Cited

U.S. PATENT DOCUMENTS

| | | | |
|---|---|---|---|
| 1,532,514 | 4/1925 | Raynes | 65/172 |
| 1,994,123 | 3/1935 | Curtis | 65/171 X |
| 2,995,417 | 8/1961 | Riedel | 65/1 X |
| 3,164,457 | 1/1965 | Mitchell et al. | 65/1 |
| 3,331,673 | 7/1967 | Bour | 65/1 X |
| 3,837,823 | 9/1974 | Shealy | 65/1 |
| 4,337,073 | 6/1982 | Drummond | 65/1 |
| 4,525,188 | 6/1985 | Jensen | 65/1 |
| 4,650,508 | 3/1987 | Dunn et al. | 65/173 X |

*Primary Examiner*—Robert L. Lindsay
*Attorney, Agent, or Firm*—John E. Curley

[57] ABSTRACT

A glass fiber forming assembly is described which permits rapid change of a production fiber glass bushing. The system includes a secondary bushing and means to heat it as well as a glass delivery bushing permanently connected to a forehearth. The production bushings are physically out of contact with the forehearth.

3 Claims, 2 Drawing Sheets

METHOD AND APPARATUS FOR FORMING GLASS FIBERS

The present invention relates to glass fiber manufacture. More particularly, the invention relates to a method and apparatus for drawing fibers from a molten glass source. Still more particularly, the invention relates to the operation and construction of a glass fiber forming assembly positioned on a molten glass delivery zone or forehearth which simplifies the problems associated with the changing of a fiber forming position for repair or replacement.

BACKGROUND OF THE INVENTION

In the manufacture of continuous glass fibers, glass batch ingredients are melted in furnaces. The molten glass resulting from the melting of the glass batch mixtures is then fed into elongated forehearths of various sizes and shapes. The molten glass flowing in the forehearths is removed at several locations positioned along the length of the forehearths from fiber forming bushings connected to the forehearth. In a typical fiber glass manufacturing operation, a glass level of predetermined height is maintained in the forehearth being fed by the glass furnace. These forehearths are normally constructed of ceramic materials resistant to molten glass attack and are frequently heated by combustion gases to maintain the molten glass during its passage through the forehearth at a given temperature. In some instances, electrodes can be used to supply all or a part of the energy as electricity to the molten glass in the forehearth to maintain the temperature of the glass at a predetermined constant.

The molten glass, as stated above, is removed from the forehearth at bushing positions located along the forehearth. In a typical position in which a bushing is located a ceramic block, called a flow block, is positioned above the bushing and typically is provided with a cutout section sloping downwardly from the forehearth bottom. This sloped opening permits the molten glass to flow from the forehearth floor to the fiber glass bushing located beneath the flow block. The flow block is normally associated with a bushing block located directly below it and to which is attached a precious metal, fiber glass forming bushing. The bushing block, like the flow block, is typically a ceramic structure with an opening adapted to support the bushings attached to it. The bushings are generally rectangular containers open at the top to receive molten glass and made of a precious metal alloy, typically platinum-rhodium alloy. While rectangular shapes are normally employed other configurations have been used. Thus, circular bushings have been used as well as square and tubular bushings.

Whatever the shapes, the bushings usually contain a plurality of orifices on the bottom thereof, 200 to 2000 or more being typical. The orifices are arranged usually in rows and vary in diameter and number from bushing to bushing depending on the product strand being made by a given bushing. The fiber glass bushing itself is mounted, typically in a cast iron frame. The frame has within its confines a castable ceramic surrounding the bushing metal to electrically isolate it from the frame material since during operation the bushing is electrically heated to maintain a given, uniform temperature therein. A typical material for this use is described in detail in U.S. Pat. No. 3,164,457 at column 4, lines 30-37. The frame is bolted to the bushing block in the normal fashion. In U.S. Pat. No. 3,837,823 a general description of the mounting of a bushing in a bushing frame and bushing block is described in detail. This patent also shows in general an arrangement of a furnace or melter and the forehearth and bushing positions associated with it.

In the manufacture of glass fiber strands, it is common for a given furnace feeding a forehearth to have positioned on that forehearth as many as 40 to 80 bushings or more. These bushings are subject to frequent replacement due to changing demands for products being made therefrom in the marketplace, as well as for repairs caused by mechanical failures such as leaks or cracks occurring in the bushings. Thus, for example, a given forehearth can be operating with a plurality of bushings which are manufacturing a G75's strand. This would mean that the forehearth is operating with 400 hole bushings which manufacture strands having 400 glass filaments in each strand and in which each filament has a diameter of 0.00036 to 0.00039 inches. During the course of that manufacture, which can occur over several months, the demand may decrease for G75 fibers. At the same time an increase in demand for K15 fibers may occur. When this happens, bushings must be changed to accommodate the changing requirements of the marketplace by replacing the bushings which manufacture the declining market strand with bushings capable of making the strand which is increasing in demand.

In order to change a fiber glass bushing on an operating forehearth, considerable difficulties are encountered in that the bushing is mounted to ceramic blocks which are in communication with molten glass contained in and continuously flowing in a forehearth. Thus, in order to remove a bushing from its position on a forehearth, the bushing first has to have its electrical supply cut off. Once this is done, the glass contained in the bushing itself is allowed to cool until it solidifies. The bushing and the associated ceramic blocks located above it must be chilled also to insure that the molten glass in the bushing block above the bushing itself has solidified prior to removal of the bushing from its bushing connection to the bushing block. When that glass, i.e., the glass in the bushing block is solidified, the bushing may then be chiseled away from the bushing block.

The chilling of bushing block and bushing is usually carried out by directing water onto the surfaces thereof for considerable periods of time. This causes thermal shock to the glass flowing in the forehearth in the vicinity of the position, which frequently effects the bushings on the forehearth located near the bushing being removed. The chiseling of the glass at the bushing-bushing block interface causes physical shock to the forehearth refractory in the vicinity of the position. These shocks cause a mechanical disturbance to the glass in the forehearth and contamination can occur in the glass flowing in the forehearth. In addition, the shock cooling of such large masses of glass and the subsequent mechanical shocks which introduce physical as well as thermal shocks to the forehearth are time consuming as well as being deleterious to normal operations. Moreover, they also reduce the productive efficiency of the entire forehearth.

Because the above circumstances existent in the art today, a need persists in the art to provide it with a bushing assembly and method of removing a bushing from a forehearth which can overcome the shortcomings of the present state of the art. Such a method and assembly are needed so that in the normal operation of a manufacturing plant frequent bushing changes can be made with a minimal disturbance to the thermal environment of the forehearths to which the bushings are attached. A method and assembly also are needed to minimize physical shock and damage to the surrounding ceramics to which the bushings themselves are attached during operation when a bushing change is made.

In accordance with the instant invention, glass fiber forming apparatus and methods are provided which satisfy this requirement of the prior art. The construction of the apparatus and operation of the methods described are such that bushings may be removed from service during a fiber glass continuous strand operation rapidly and with minimum effect on the surrounding environment.

SUMMARY OF THE INVENTION

An object of the invention is to provide a bushing that can be moved from a forehearth position rapidly.

Another object of the invention is to provide a method of changing a glass fiber forming bushing while minimizing thermal shock to forehearth glass.

Still a further object of the invention is to provide a method of changing fiber glass forming bushings which require no mechanical shock to the surrounding forehearth.

A still further object of the invention is to provide for minimized fiber formation interruption when bushing changes are effected on a fiber making forehearth.

Another object of the invention is a bushing and forehearth assembly that permits bushings to be interchanged readily to accommodate product change requirements.

It is a still further object of the invention to provide a glass monitoring system in the forehearth to control glass flow as bushings are changed.

These and other objects of the invention will become apparent from the ensuing description of various embodiments of the invention.

The objects of the invention are provided by a novel method and bushing assembly not heretofore contemplated.

In accordance with the instant invention, molten glass is passed from a forehearth through a controlled flow opening therein which is positioned above a fiber glass forming bushing. The bushing which is located below the controlled glass flow opening is physically detached from the forehearth. Thus, glass flows from the controlled molten glass flow opening directly into the bushing from the forehearth. Level of glass in the bushing is maintained by controlling the volume of glass flowing through the flow controlled opening in the forehearth and the rate of removal of glass at the bushing orifices to maintain a steady state inside of the bushing. The bushing is movable, preferably in a horizontal plane below the forehearth on a track system which permits it to move from under the opening in the forehearth to disengage it from the flowing glass. The glass flow can be stopped during movement of the bushing on it may continue to flow since the system is preferably provided in each instance with a spare bushing that can be automatically moved into position below the controlled glass flow opening in the forehearth when the first bushing is moved from beneath it. The method and apparatus of the instant invention will become more apparent in the ensuing description of the invention and its preferred embodiments.

BRIEF DESCRIPTION OF THE DRAWINGS

For a more complete understanding of the instant invention, reference is made to the accompanying drawings in which.

DETAILED DESCRIPTION OF THE INVENTION

Figure 1:
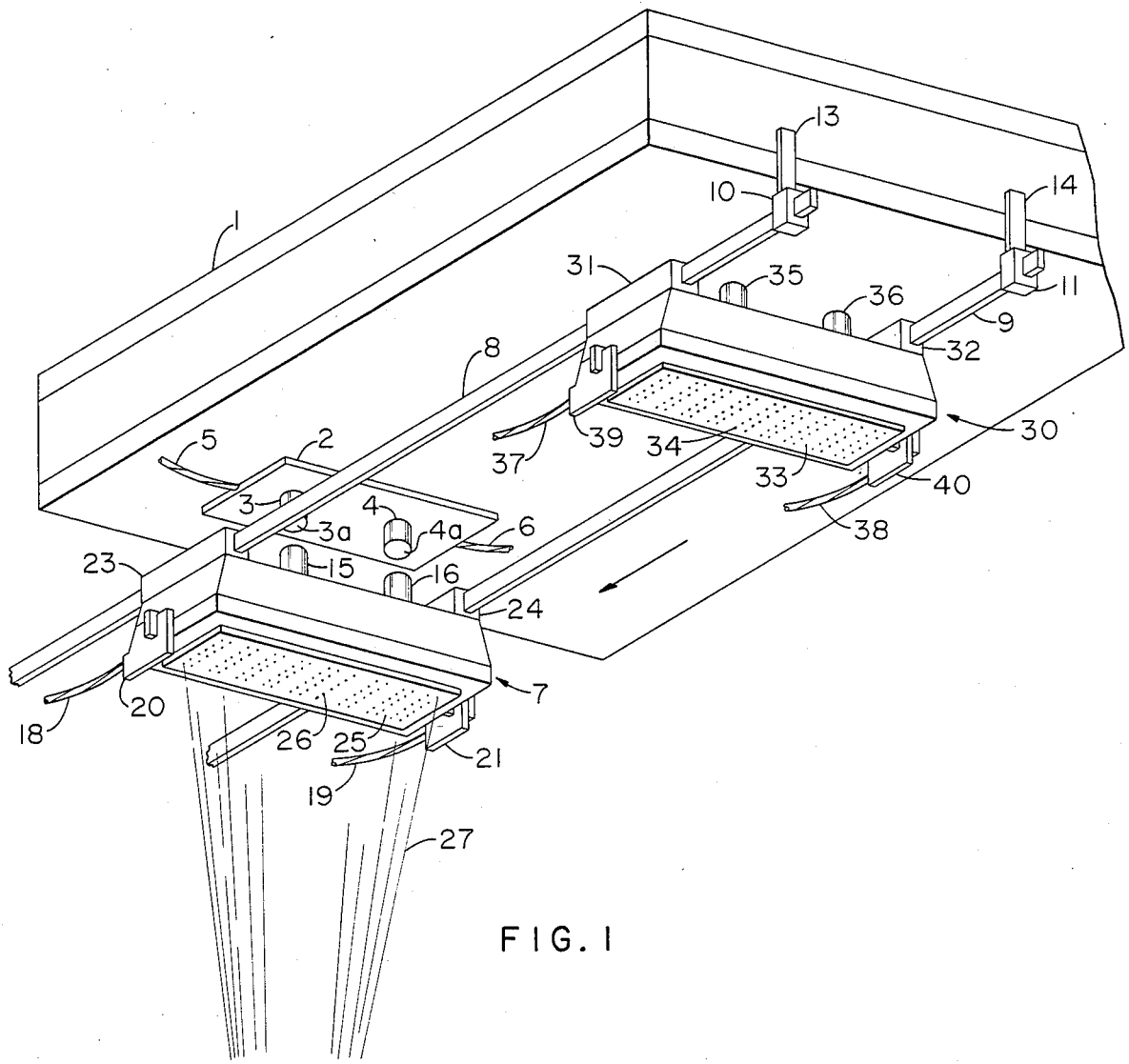
FIG. 1 is a view in perspective of one embodiment of the bushing assembly of the invention.

The instant invention will now be described in detail with reference to the drawings and in particular, to FIG. 1 which shows a forehearth, 1 which is attached to a suitable glass melter (not shown) and in which during operation of a fiber glass forming operation, molten glass continuously flows under a controlled head. The underside of forehearth 1 is provided with an opening (not shown) which is covered by a glass delivery plate 2 having two downwardly depending tubes 3 and 4 therein. Tubes 3 and 4 are open at their respective ends 3a and 4a and are also in fluid communication with the molten glass in forehearth 1. Electrical leads 5 and 6 are provided, one on each side of plate 2. These leads are connected to a suitable power supply, i.e., an AC transformer, during operation so that the plate 2 and associated tubes 3 and 4 can be constantly heated to maintain glass passing through the tubes molten and at a desired temperature and viscosity.

Located below the plate 2 is a production bushing indicated generally as 7. Bushing 7 is shown mounted on two parallel rails 8 and 9. The rails 8 and 9 are shown mounted at one end in blocks 10 and 11 respectively. The blocks 10 and 11 in turn are maintained in their spaced position below the forehearth 1 by mounting straps 13 and 14 which are normally welded to the steel framework of forehearth 1.

Bushing 7 is provided with two tubular glass receptors 15 and 16 in the preferred embodiment which, when bushing 7 is placed below plate 2, will be positioned directly below the tubes 3 and 4 of plate 2. Typically, the receptors 15 and 16 have a diameter greater than the diameter of tubes 3 and 4 to insure that the glass flowing from those tubes enters the receptors 15 and 16 without any loss of glass due to spillage on tube sidewalls.

Bushing 7 is also provided with leads 18 and 19, each of which is connected at one end to a bushing connector 20 and 21 respectively. The leads 18 and 19 are connected at their other ends across the secondary of a suitable AC transformer so that the bushing 7 can be continuously heated during operation. While not shown, it will be understood that bushing 7 in this embodiment has a cover member thereon and thus, the fluid communication to the interior of the bushing is through the tubes 15 and 16. The blocks 23 and 24 which hold the bushing 7 on rails 8 and 9 respectively are constructed of electrically insulating material so that the rails and forehearths are electrically isolated from the bushing power supply. Plate 2 is similarly isolated electrically from the forehearth 1 by having electrically insulating gaskets provided between it and the forehearth. Bushing 7 is also provided with a faceplate 25 having located thereon several rows of holes or orifices 26 through which individual streams of molten glass flow to form the fibers 27.

As shown in FIG. 1, there is provided adjacent to bushing 7 and coupled to the same rails 8 and 9 a second fiber glass production bushing generally indicated as 30. Bushing 30 is attached to the insulating block members 31 and 32 which ride on the rails 8 and 9. Bushing 30 is provided with a faceplate 32 having rows of holes 34 therein through which individual streams of glass flows to form glass fibers. A top for bushing 30 (not shown) is provided and tubes 35 and 36 are provided in the top and are in fluid communication with the interior of the bushing 30. Bushing 30 has leads 37 and 38 each of which is connected at one end thereof to bushing electrical connectors 39 and 40 respectively. The other or free ends of leads 37 and 38 are connected across the secondary of a suitable AC power transformer to supply current to the bushing 30 when the power is applied thereto thus maintaining bushing 30 at any desired temperature.

In operation of the bushings 7 and 30 shown in FIG. 1, current is continuously supplied to plate 2 to maintain the plate 2 and its associated tubes 3 and 4 at any desired temperature above the melting point of the molten glass being fed from forehearth 1 through the tubes 3 and 4. The molten glass flowing through tubes 3 and 4 is passed from the ends 3a and 4a thereof into the tubes 15 and 16 respectively and into the interior of bushing 7. Bushing 7 is continuously heated by the application of electrical energy thereto through leads 18 and 19 and bushing connectors 20 and 21 respectively and the temperature is maintained at that desired for a predetermined glass viscosity for the molten glass passing from the bushing through holes 26 in faceplate 25.

When bushing 7 is to be changed for any reason such as malfunction change to a new product requires different sized holes and the like bushing 30 is activated. The activation of bushing 30 involves feeding current to the bushing through leads 37 and 38 and the bushing connectors 39 and 40. This results in a heating of the bushing to a desired temperature preferably at or within 50° F. of the desired final operating temperature of the bushing 30.

When bushing 30 has reached the desired temperature, the current to the plate 2 is cut off and the plate allowed to cool. Current to the bushing 7 is similarly cut off and the filaments 27 are drawn until the bushing 7 is emptied. The molten glass passing through tubes 3 and 4 in a short time solidifies after the current to the plate 2 is cut off and thus, glass no longer flows into the bushing 7. As soon as the glass in bushing 7 no longer flows out of orifices 26, bushing 7 is moved out from under plate 2 by passing it in the direction of the arrow on rails 8 and 9. Bushing 30 is moved on the same rails under the plate 2 and the tubes 35 and 36 are centered under the tubes 3 and 4 respectively. Plate 2 is again electrically heated by applying current thereto through leads 5 and 6 and maintained at the desired temperature once the flow of glass begins through tubes 3 and 4. Bushing 7 once it has cooled can be removed and replaced with another bushing so that the new bushing can replace bushing 30 when that is to be changed. The movement of the bushings 7 and 30 on the rails 8 and 9 can be accomplished by manual or automatic means. Both bushings may, for example, be placed on the rails with appropriate stops provided so that they move simultaneously over a fixed distance that will automatically insure that the replacement bushing stops in the precise location required to align the tubes in plate 2 with those in the production bushing. The bushings can be tied by suitable motors and cable linkages to be moved by activating a switch or by hand. The skilled artisan will appreciate that regardless of whether done by a manual or an automatic system, the method and apparatus shown permits a bushing change to occur with little thermal shock to the forehearth and with no mechanical disturbance of the forehearth or its contents.

Figure 2:
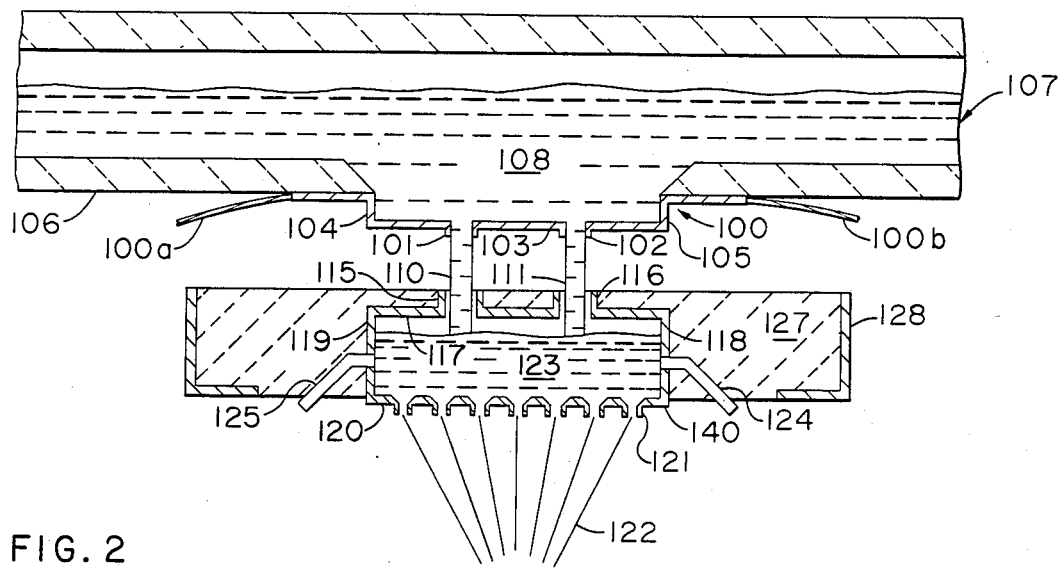
FIG. 2 is a view in perspective of another embodiment of the bushing assembly of the invention.

Turning now to FIG. 2, there is shown a bushing assembly in cross-section similar to FIG. 1 but without the mounting equipment shown. Thus, the bushing assembly is provided with a molten glass delivery bushing 100, having two tubes 101 and 102 depending downwardly from the bottom 103 thereof. Delivery bushing 100 is heated by electrical leads 100a and 100b which are in operation connected to an AC power transformer of suitable size. The bushing 100 is also provided with sidewalls 104 and 105. Bushing 100 is affixed to the refractory 106 of the bottom of the forehearth 107 which has molten glass 108 flowing therein and maintained at a given level as shown. Molten glass streams 110 and 111 flow from tubes 101 and 102 respectively downwardly and into tubes 115 and 116 respectively of the bushing 140. Bushing 140 has a frame 128 associated therewith which contains a cast refractory 127 in which the top 117 and sidewalls 118 and 119 of the bushing 140 are embedded. Bushing 140 is also provided on its faceplate or bottom 120 with a plurality of orifice tips 121 through which the molten glass 123 in bushing 140 flows during operation to form individual filaments 122. Bushing 140 is provided on each of two sides thereof with bushing ears or electrical connectors 124 and 125 which in operation are electrically coupled by suitable bus bars, not shown, to the secondary of an AC transformer of appropriate size to insure that sufficient power is supplied to the bushing 140 to heat it high enough to maintain the molten glass 123 at a desired temperature during production of the filaments 122.

When this bushing 140 is in operation and it is desired to replace it, the power to the delivery bushing 100 is cut by discontinuing the flow of electricity through leads 100a and 100b. When the bushing 100 cools sufficiently to no longer provide a glass flow through columns 101 and 102, bushing 140 has its power cut and when filaments 122 can no longer be drawn therethrough, the bushing 140 is moved from its mounting (not shown) underneath bushing 100. A new production bushing similar to 140 is then mounted below bushing 100 and when set in place, its inlets 115 and 116 are in alignment with tubes 101 and 102. Power is placed on the new bushing to bring its temperature to the desired level. Bushing 100 is again supplied with power to cause the glass solidified in tubes 101 and 102 during the shutdown to melt and flow again forming columns of molten glass 110 and 111 which feed into tubes 115 and 116 of the new production bushing. Again the replacement is effected with no mechanical shock to the forehearth 107 and little or no thermal shock.

Figure 3:
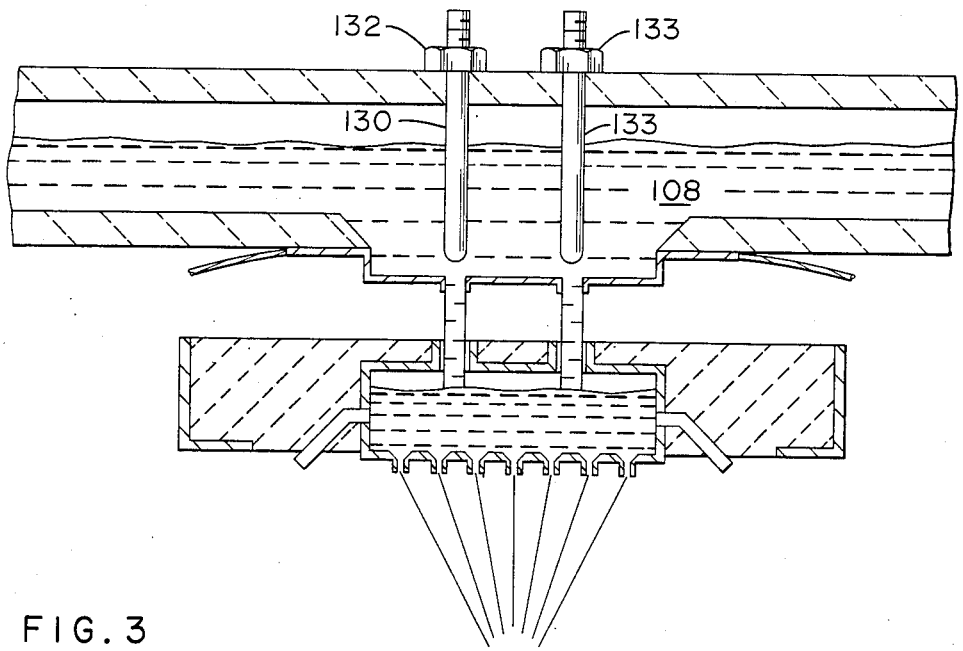
FIG. 3 is a front elevation of yet another embodiment of the invention.

Turning now to FIG. 3, there is shown a bushing identical to that of FIG. 2, but which is provided with a forehearth shut off system that includes two vertical threaded shafts 130 and 131. Both shafts are held in their depicted vertical position by nuts 132 and 133. Shaft 130 is positioned above column 101 and shaft 131 above column 102. By turning the threaded shafts, they may be lowered to a point in bushing 100 that will block the flow of molten glass 108 completely or restrict it severely. This system may be used during the shut down procedure so that the disconnection of the production bushing can be accomplished without waiting for the molten glass in column 101 and 102 to solidify. Thus, the tubes 101 and 102 can be blocked completely by lowering shafts 130 and 131 a sufficient distance so that column 101 and 102 no longer receive glass. Bushing 100 is then electrically shut down to cool any residual glass in columns 101 and 102 at the exit ends thereof. Bushing 140 is also disconnected and once the glass has been emptied therefrom a heated replacement bushing is mounted under bushing 100 again with tubes 101 and 102 of it aligned with inlets 115 and 116 of the new production bushing.

It will be understood by the skilled artisan that shafts 130 and 131 as well as all other metal surfaces which are contacted by molten glass are constructed of an appropriate precious metal or precious metal alloy. Platinum and platinum-rhodium alloys are preferred materials for those uses. While a rail system that can be utilized with manual or motorized movement of the production bushing has been shown, it will be understood that other modification of the inventions can be made without departing from the spirit and scope thereof.

Thus, while the invention has been described with reference to contain illustrated embodiments thereof, it is not intended that it be limited thereby except insofar as appears in the accompanying claims.

I claim:

1. A bushing assembly comprising a molten glass delivery means attached to a molten glass-containing forehearth, means to pass electric current through said glass delivery means including means to control the flow of glass from the forehearth through said delivery means, a first fiber glass forming bushing having means to electrically heat the bushing, said first bushing being in fluid communication with said glass delivery means and mounted below and out of physical contact with said glass delivery means, a second bushing having means to electrically heat it, said secondbushing positioned below and out-of-fluid contact with said forehearth and said glass delivery means and in the same horizontal plane as said first fiber glass forming bushing, means to move said first fiber glass forming bushing out-of-fluid communication with said glass delivery means when glass flow thereto is discontinued and means to move said second fiber glass forming bushing into fluid communication with said glass delivery means when said first bushing is moved out of contact therewith.

2. A bushing assembly for forming fiber glass comprising a forehearth having an opening therein and containing molten glass, electric heating means for heating a glass delivery means attached to said forehearth opening, said glass delivery means being provided with at least one opening therethrough through which molten glass from the forehearth can flow, mechanical means associated with said glass delivery opening to reduce or shut off the flow of molten glass therethrough, an electrically heated bushing open at its top and mounted below and out of physical contact with said glass delivery opening but in fluid communication therewith to thereby permit glass flowing through said glass delivery opening to enter said bushing, means to move said bushing out of communication with said glass delivery opening and means to move a second electrically heated bushing into fluid communication with but out of physical contact with said glass delivery opening once the first bushing is moved out of communication therewith.

3. A method of forming glass fibers comprising feeding molten glass through an opening in a forehearth containing molten glass into an electrically heated melting zone, metering the glass in said melting zone through a plurality of precision openings located therein by controlling the electric current fed to said melting zone, passing the metered glass to a glass fiber forming bushing having a bottom, side walls and an open top which is positioned below and out of physical contact with said metering zone, controlling the flow of molten glass from the metering zone to the fiber forming bushing to establish a molten glass level in the fiber forming bushing which is below the level of the top of the bushing walls, removing molten glass from the bottom of the bushing in a plurality of individual streams, attenuating said streams of molten glass at a given rate to thereby form fibers and correlating the flow of the glass from the metering zone to the bushing and the rate of attenuation the molten glass from the bushing to maintain a glass level in the bushing at a level below the top of the bushing walls and above the bottom of the bushing.

* * * * *